Oct. 4, 1932.  C. H. WILL  1,880,620
AUTOMOBILE HEATER AND DEFLECTOR THEREFOR
Filed Jan. 9, 1929   3 Sheets-Sheet 1

INVENTOR
CARL H. WILL
By
ATTORNEYS

Oct. 4, 1932.                    C. H. WILL                    1,880,620
AUTOMOBILE HEATER AND DEFLECTOR THEREFOR
Filed Jan. 9, 1929          3 Sheets-Sheet 2

INVENTOR
CARL H. WILL
ATTORNEYS

Oct. 4, 1932.    C. H. WILL    1,880,620
AUTOMOBILE HEATER AND DEFLECTOR THEREFOR
Filed Jan. 9, 1929    3 Sheets-Sheet 3

INVENTOR
CARL H. WILL
ATTORNEYS

Patented Oct. 4, 1932

1,880,620

UNITED STATES PATENT OFFICE

CARL H. WILL, OF MINNEAPOLIS, MINNESOTA, ASSIGNOR TO TROPIC-AIRE, INCORPORATED, OF MINNEAPOLIS, MINNESOTA, A CORPORATION OF DELAWARE

AUTOMOBILE HEATER AND DEFLECTOR THEREFOR

Application filed January 9, 1929. Serial No. 331,265.

An object of the invention is to provide an automotive vehicle heater, situated interiorly of a vehicle body, having a heat deflector adjustably associated with said heater and capable of being positioned at will to direct warm air emanating from the heater toward any preferred part of the interior of the vehicle body, as, for example, toward or away from the driver or other occupant of the vehicle.

A further object is to provide an adjustable heat deflector which will also serve as a heat regulator adapted to control the passage of warm air from the heater to the vehicle body interior.

Other objects and advantages of the invention will become obvious as the full description thereof proceeds, it being understood that the disclosure herein is merely illustrative and that the invention is not limited to the exact structures set forth, various changes being permissible within the scope of the claims which follow.

In the accompanying drawings forming a part of this specification;

Figures 1, 2:
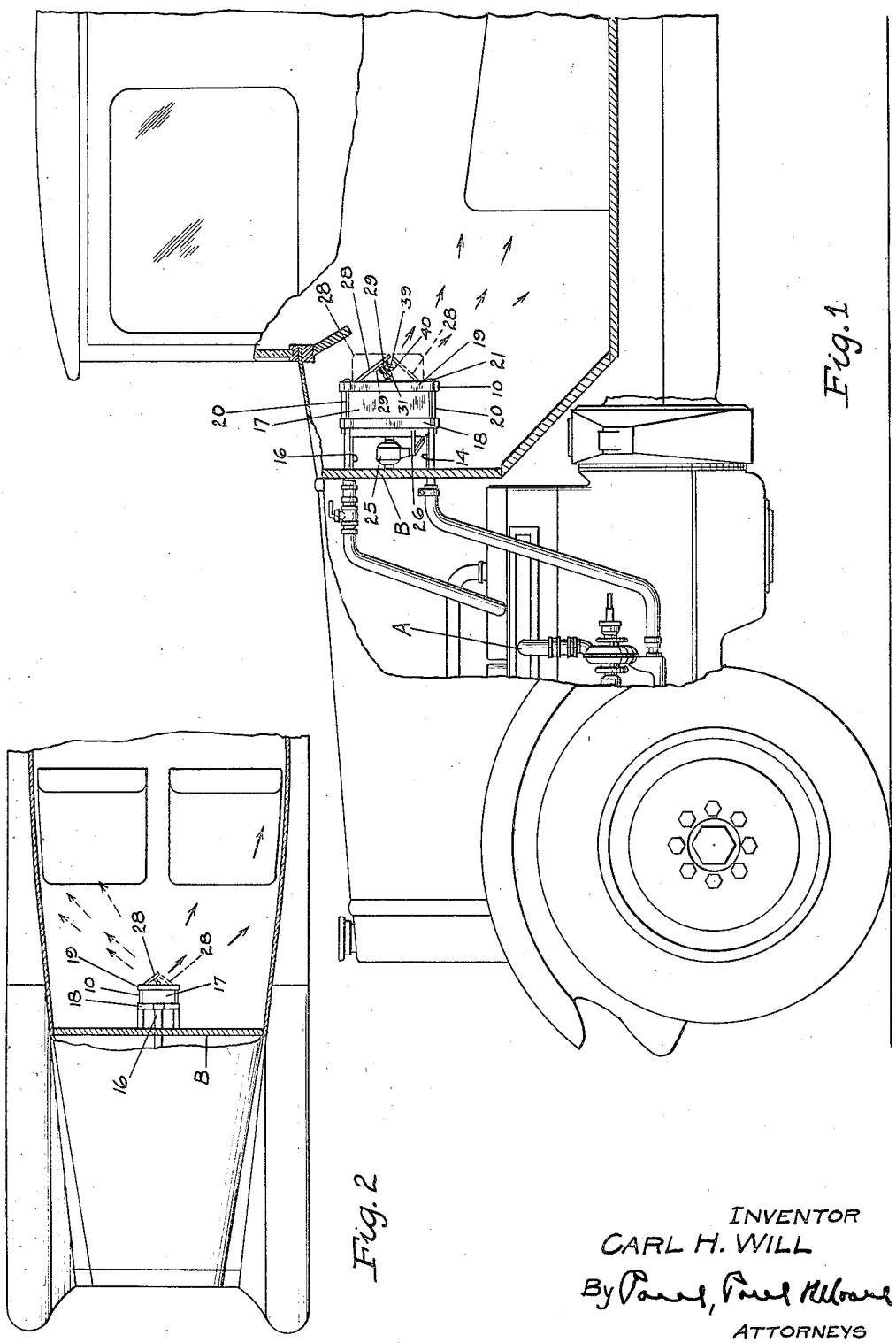
Figure 1 is a view in side elevation of an apparatus having the features of the invention, disclosing a manner of associating the apparatus with an automotive vehicle and its water-circulating system.
Figure 2 is a top plan view of the apparatus of Fig. 1, on a smaller scale, a part of the automotive vehicle also being shown.

With respect to the drawings, numeral 10 represents, generally, a heating element of the construction substantially as disclosed in the reissue patent to Caesar, No. 17,131, granted November 13, 1928. That is to say, the present heating element 10, which will be mounted within an automotive vehicle body, preferably as disclosed in Figures 1 and 2, but could be otherwise mounted in the vehicle body, comprises a plurality of horizontally or parallelly disposed tubes 11, desirably having their end portions 12 flared outwardly and suitably secured together (in a manner not necessary to be specifically disclosed). A water chamber 13 is provided in the lower portion of the heating element and has an outlet pipe 14 leading to the water-circulating system A of the automotive vehicle. A similar water chamber 15 is provided in the upper portion of the heating element and has an intake pipe 16 leading from said automotive vehicle water-circulating system. The water chambers 13 and 15 communicate with water-circulating passages 43 between the tubes 11, so that when water is circulated through the water-circulating system A of the automotive vehicle and through the heating element, all of the tubes will be completely surrounded by hot water. The outer walls of the water chambers 13 and 15 are constituted by a continuous plate or wall 17 arranged to encircle all of the tubes 11 and to provide a casing therefor. Peripherally closed frames 18 and 19 are clamped to the casing 17 of the heating element to provide a reinforcement therefor and to present a finished and neat appearance. The frames 18 and 19 may be supported upon the automotive vehicle in any suitable manner, as by means of tie bolts 20 passing through the automotive vehicle dash B and through apertured ears provided in the frames. Spacing sleeves upon the tie bolts 20 and between the dash of the vehicle and the inner frame 18, may serve to locate the heating element in spaced relation to the dash, and may cooperate with heads 21 of the tie bolts to secure the frames 18 and 19 against the casing 17. The inner portions of the outlet and intake pipes 14 and 16 may pass through suitable apertures in the vehicle dash, or other wall, B. The particular water-circulating system utilized is immaterial so far as the present invention is concerned, the one illustrated being satisfactory. Means for establishing a forced circulation of heated air within the vehicle body may consist of a fan 22 upon the shaft 24 of a motor 25, and a frame 26, itself integral with the frame 18, or otherwise suitably carried by the tie bolts 20 (in a manner not necessary to be shown), supporting the motor.

The parts, as so far described, are a portion of the disclosure of the Caesar reissue patent, referred to hereinbefore. The fan forces air through the tubes 11, heated by the hot water circulating thereabout, and thus warms the air in the vehicle body and keeps the warm air continuously in circulation.

The specific purpose of the present invention is to provide a deflector for the heated air forced through the tubes 11, which will have the features and characteristics as now to be set forth, and will be capable of adjustable, and desirably removable, association with a heating element having the general characteristics and arrangement as illustrated and as briefly outlined.

Figure 4:
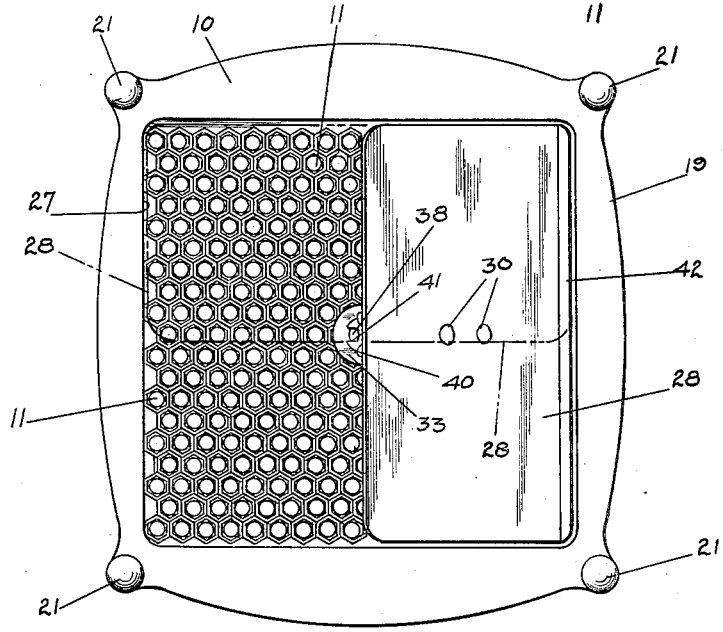
Figure 4 is a front elevational view of the heating element and deflector of Figures 1, 2 and 3.

Referring more particularly to Figure 4, it will be seen that the open portion 27 of the front face of the casing 17 is there disclosed as practically square. Numeral 28 designates a deflector plate having length a trifle less than one dimension of the square open portion 27, and having width slightly greater than one-half of said dimension of the square open portion. The deflector plate could be of greater or less dimensions than stated.

Arms 29, suitably secured to the deflector plate 28 in any ordinary or preferred manner, as at 30, and desirably arranged about perpendicularly thereto, include spaced apart, complemental socket, or concave, members 31.

Figure 3:
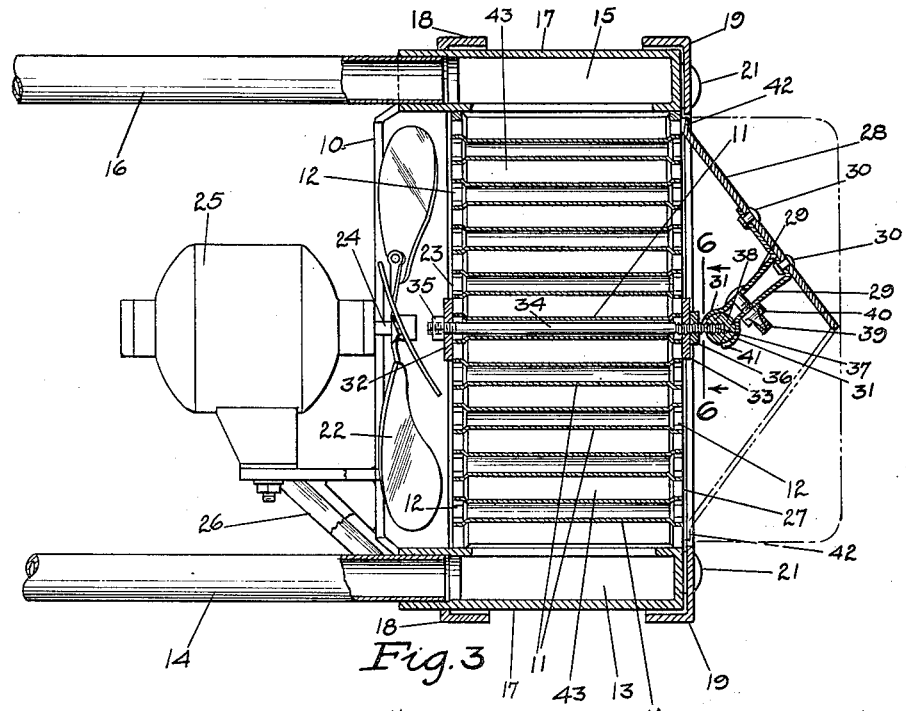
Figure 3 is an enlarged central sectional view, partially in elevation, of the heating element with deflector disclosed in Figures 1 and 2.

In Figures 3 and 4 of the drawings, I have shown stud plates 32 and 33 arranged adjacent the inner and outer ends, respectively, of a tube 11, (desirably the central tube of the heating element) and I have illustrated a stud 34 as passing through the full length of said tube and through said stud plates. A head or nut 35 upon the inner end of the stud 34 cooperates with a nut 36, when turned home upon the outer, threaded end portion 37 of said stud, to clamp said stud plates against the opposite ends of said tube 11 having said stud, to thus fixedly secure the stud in the heating element, as will be obvious. An outer extension of the threaded end portion 37 carries a ball 38.

The socket members 31 are adapted to engage the ball 38, to constitute therewith a ball and socket, or universal, joint. A clamping bolt 39 extending through the arms 29 has a wing nut 40 by utilization of which, in an obvious manner, the socket members 31 can be secured with any desired pressure against the ball 38, or can be caused to have little or no pressure against said ball to be easily removable therefrom. Slots 41 in the outer ends of the socket members 31 allow for complete universal movement of the socket joint.

Figure 5:
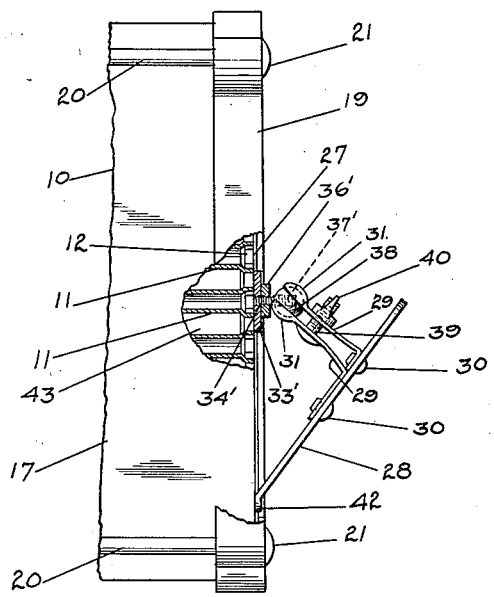
Figure 5 is a side elevational view, partially sectioned and partially broken away, of a fragment of a heating element and deflector as in Figures 3 and 4, but disclosing a slightly different arrangement of means attaching the deflector to the body of the heating element.
Figure 6:
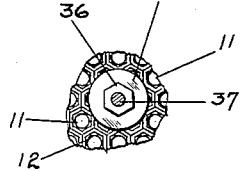
Figure 6 is a detail sectional view taken as on line 6—6 in Figure 3.
Figure 7:
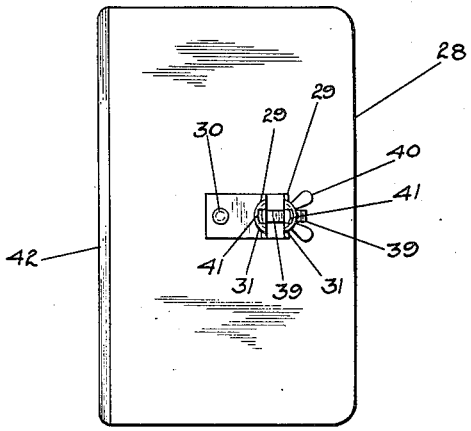
Figure 7 is a rear elevational view of the deflector removed from the heating element.

In Figure 5 of the drawings, I have shown a structure similar in all respects to the structure of Figures 3 and 4, except that there is, in the present instance, (in lieu of the two studs 32 and 33, the stud 34, the head or nut 35, and the nut 36), a single stud plate 33' soldered, welded, or otherwise secured to the outer end of a tube or tubes 11, and a stud 34', threaded into the stud plate 33'. A lock nut 36' upon the threaded end portion 37' of the stud 34' serves to lock said stud 34' in the stud plate 33'. An extension of said threaded end portion 37' of said stud 34' carries a ball 38, as in the form of the invention illustrated in Figures 3 and 4.

It may be considered desirable to utilize the deflector attaching means of the type disclosed in Figures 3 and 4 of the drawings under some circumstances, as, for example, when originally fitting heating elements already on the market with heat deflectors, or when making replacements, while it may be preferable to utilize the deflector attaching means of the type disclosed in Figure 5 under different circumstances, as, for example, when manufacturing heating elements intended to include heat deflectors.

The manner in which the deflector is used upon and is adjustable upon the heating element will be plain from Figures 1 to 5 of the drawings. In each of said figures, the body of said deflector is disclosed as extending inwardly of the heating element from a location adjacent an edge portion thereof, and obliquely away from the forward face of said heating element, a straight marginal edge portion 42 of the deflector being arranged at an angle to the body thereof to lie flush against said forward face. In full lines in Figure 3, the deflector is shown adjacent the top side or half of the heating element, while in dotted lines said deflector is disclosed as it would appear at either right or left bottom side of said heating element. In full lines in Figure 4, the deflector is adjacent the right side of the heating element, and in dotted lines, it is at the top thereof. In Figure 5 the deflector is adjacent the bottom side of the heating element. To adjust the deflector to or away from any of its various positions, all that is necessary is to cause the marginal edge portion 42 thereof to swing on the universal joint to clear the frame 19; to then swing the deflector plate sidewise about the universal joint until at the desired location; and to finally swing the marginal edge portion 42 back against the adjacent face of the heating element. In practice, the socket members 31 will resiliently grip the ball 38 with sufficient tightness to assure that the heat deflector will remain in any adjusted position at which placed. When it may be desired to remove the deflector from the heating element, this can be done by turning the wing nut 40 to ease the pressure at which the socket members 31 engage the ball 38, so that said socket members can be easily slid off of the ball.

In full lines in Figure 1 of the drawings, the deflector is disclosed positioned at the upper portion of the heating element to direct the heat downwardly, in the direction of the arrows, toward the floor of the vehicle. In dotted lines in said Figure 1, the deflector is positioned to direct the heat upwardly or sidewise. In Figure 2, the full line deflector is directing the heat toward the left, or toward the driver's seat, as disclosed by the full line arrows, while in dotted lines, the deflector is directing the heat toward the right, or away from the driver. See the dotted arrows in Fig. 2. The deflector could, obviously, be situated at position intermediate the positions as disclosed in the drawings to direct the heat toward any preferred part of the interior of the vehicle body.

While I have described the opening 27 through the heating element as square in outline, and the deflector plate 28 as oblong, it will be evident that either said opening 27, or said plate 28, or both, may be of variant shape, within the principles of my invention.

The obliquely disposed deflector plate 28 will deflect the heated air directly impinging against it in a direction transversely to the direction of flow of said heated air through the tubes 11, and the warm air so deflected will, obviously, cause deflection, in the same general direction, of heated air which passes through tubes 11 out of alinement with the deflector plate.

Clearly, the heating element 10 could be supported adjacent a wall of the vehicle body other than the dash B. For example, said heating element could be situated between the front and rear seats of the vehicle, instead of forwardly of the front seat as it is disclosed. In either case the heater could rest upon the floor of the vehicle.

I claim as my invention:

1. In combination, a heating element including spaced apart tubes, a shank fixed in one of said tubes, a joint member carried by said shank, a heat deflector, and a complemental joint member upon said heat deflector.

2. In combination, a heating element having an air passage, a shank fixed in said air passage and including a threaded portion extending therefrom, a ball having an internal thread receiving said threaded portion, a heat deflector, and spaced apart socket elements upon said heat deflector adapted to engage said ball.

3. In combination, a heating element including a tube, stud plates adjacent the opposite ends of said tube, a shank passing through the stud plates and tube, means upon the shank for locating the stud plates against the tube to lock the shank in said heating element, a joint member carried by said shank, a heat deflector, and a complemental joint member carried by said heat deflector.

4. In an automobile heater, a heating element having an open front, a deflector adapted to partially cover said open front, and means for mounting said deflector for universal movement on said heating element, said means comprising a ball member on said heating element, a pair of arms on said deflector having complemental socket members adapted to engage said ball, and means for relatively adjusting said arms to bring said socket members into tight holding engagement with said ball.

5. In an automobile heater, a heating element having an open front, a deflector adapted to partially overlie said open front, and means for mounting said deflector for universal movement upon said heating element, said means comprising a ball member on said heating element, a pair of arms having at one end means for securing them to said deflector and at the other end complemental socket members for engaging said ball, and means for drawing said arms together to bring said socket members into tight holding engagement with said ball member.

In witness whereof, I have hereunto set my hand this 26 day of December 1928.

CARL H. WILL.